(12) United States Patent
Kuruppu et al.

(10) Patent No.: US 9,875,136 B2
(45) Date of Patent: Jan. 23, 2018

(54) SYSTEM FOR EFFECTING PERIODIC INTERRUPTIONS TO TRANSFER OF INFORMATION AND DYNAMICALLY VARYING DURATION OF INTERRUPTIONS BASED ON IDENTIFIED PATTERNS OF THE INFORMATION

(71) Applicants: Indrajith Kuruppu, Colombo (LK); Don Damith Nadishan Colambathanthrige, Homagama (LK)

(72) Inventors: Indrajith Kuruppu, Colombo (LK); Don Damith Nadishan Colambathanthrige, Homagama (LK)

( * ) Notice: Subject to any disclaimer, the term of this patent is extended or adjusted under 35 U.S.C. 154(b) by 203 days.

(21) Appl. No.: 14/400,219

(22) PCT Filed: May 11, 2013

(86) PCT No.: PCT/IB2013/053825
§ 371 (c)(1),
(2) Date: Nov. 10, 2014

(87) PCT Pub. No.: WO2013/171647
PCT Pub. Date: Nov. 21, 2013

(65) Prior Publication Data
US 2015/0149676 A1 May 28, 2015

(30) Foreign Application Priority Data

May 13, 2012 (WO) .................. PCT/IB2012/052377
May 13, 2012 (WO) .................. PCT/IB2012/052378

(51) Int. Cl.
*G06F 9/48* (2006.01)
*G06F 13/24* (2006.01)

(52) U.S. Cl.
CPC ............ *G06F 9/4812* (2013.01); *G06F 13/24* (2013.01); *Y02B 60/1228* (2013.01)

(58) Field of Classification Search
None
See application file for complete search history.

(56) References Cited

U.S. PATENT DOCUMENTS

| | | | | |
|---|---|---|---|---|
| 3,146,519 A * | 9/1964 | Redwine | ............. | H01R 43/058 174/84 C |
| 4,312,227 A * | 1/1982 | Ozols | .................. | G01P 15/0888 200/61.47 |
| 5,325,322 A * | 6/1994 | Bailey | .................... | H03H 15/00 708/819 |
| 2002/0184288 A1* | 12/2002 | Vargas | .................. | G06F 1/3203 718/100 |

(Continued)

*Primary Examiner* — Meng An
*Assistant Examiner* — Michael Ayers

(57) ABSTRACT

A novel approach to coordinate processes in a process environment includes establishing a coherent temporal and resource framework for operation of selected processes in order to formulate a basis for coordination. A key aspect of the present innovation includes the novel techniques for coordinating processes including transmission of electromagnetism and transmission of electromagnetic radiation in a process environment by effecting periodic interruptions, based upon the abovementioned coherent temporal and resource framework, while maintaining the required operational and safety procedures.

15 Claims, 3 Drawing Sheets

(56) References Cited

U.S. PATENT DOCUMENTS

| | | | |
|---|---|---|---|
| 2004/0062325 A1* | 4/2004 | England | H04L 27/00 375/340 |
| 2005/0154938 A1* | 7/2005 | McLamb | G06F 11/1438 714/17 |
| 2007/0089165 A1* | 4/2007 | Wei | H04L 12/585 726/4 |
| 2008/0271030 A1 | 10/2008 | Herington | |

* cited by examiner

SYSTEM FOR EFFECTING PERIODIC INTERRUPTIONS TO TRANSFER OF INFORMATION AND DYNAMICALLY VARYING DURATION OF INTERRUPTIONS BASED ON IDENTIFIED PATTERNS OF THE INFORMATION

FIELD OF INVENTION

The present invention relates to process coordinating systems, and more particularly, to establishing the respective temporal states in processes, including in facets of electromagnetism and electromagnetic radiation, corresponding with their respective resource utilisations and outcome in order to facilitate formulating a coherent basis for process management.

BACKGROUND

Coordinating processes is a key prerequisite in optimising resource utilisation and outcome. Coordinating processes in a coherent manner, however, has continued to pose major challenges. Inability to fully overcome these challenges has resulted in substantial additional usage of resources and below optimum outcome as well. In this context, the challenges related to coordinating processes that are vastly different in temporal scales and resource scales in terms of coherent temporal and resource frameworks can be identified as one possible area that demands further examination.

While there has been much progress in coordinating operation of processes towards optimising the resources and outcome, the lack of coherent frameworks that have the capacity to coordinate operation of processes is evident through common examples of process management such as supplying of electricity and obtaining kinetic energy, for instance, in the operation of an electric motor. As evident through this typical illustration, the present approaches have to take the premise that the best possible way to coordinate operation of these processes is to ensure electricity is supplied 'all the time', despite the fact that temporal scales and the corresponding resource scales in operation of one process, namely, transmission of electrical energy and those of the resulting process—the motor speed due to kinetic energy—differ a great deal is widely known.

The key technical problem addressed by the proposed innovation can be outlined in relation to abovementioned lack of coherent frameworks mainly due to the fact that widely adopted approaches in the field of process management so far do not provide sound bases for incorporation of operation of processes that occur in temporal extents shorter than the smallest time unit adopted in such approaches (e.g. the operational steps in computing based process management systems), for example, transmission of electricity in an equipment, formulation of a plurality of microscopic scale bonds in a chemical process and transmission of an electromagnetic radiation beam in a device (e.g. an Infrared beam in a device) as entities in terms of a common temporal scale together with their respective associated processes. Due to lack of such bases for incorporating operation of these processes in terms of a common temporal scale, differentiation of their respective temporal extents (e.g. differentiations between a specific duration of supply of electricity and a specific duration of maintaining required kinetic energy in motor) on a consistent and robust context specific manner has not been possible so far, resulting in remarkably sub optimum utilisation of resources and outcome as well.

The present innovation as its technical solution to the problem outlined above discloses a computing based generic approach that facilitates incorporating operation of such processes as quantifiable entities in terms of a common temporal scale, thus establishing a coherent framework for coordinating operation of different processes that have varied temporal scales, namely, those occurring in temporal extents shorter as well as longer than its variable operational step enabling its adoption in a wide range of practical applications and advantageous as further described in detailed description below.

DETAILED DESCRIPTION

Figure 1:
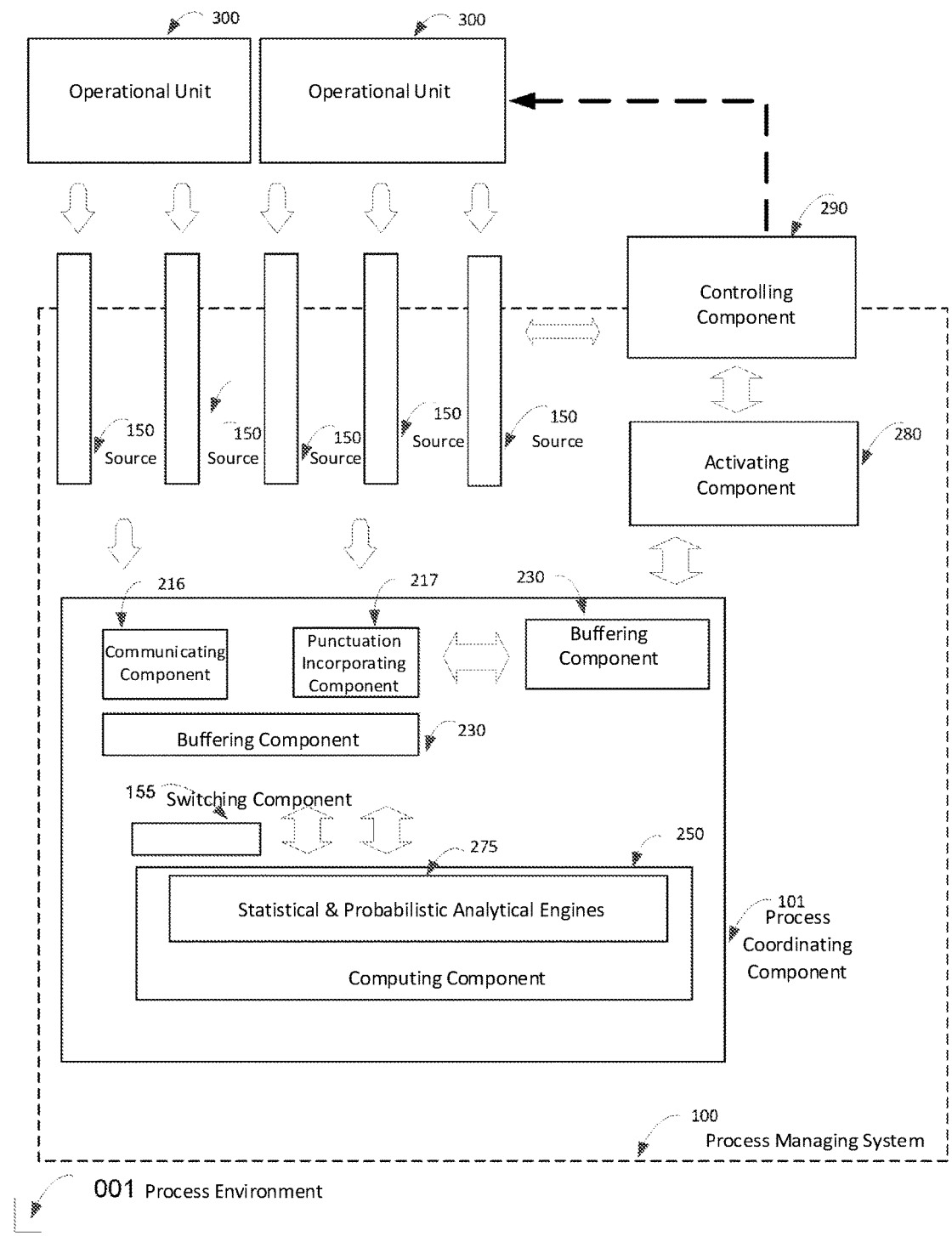
FIG. 1 illustrates a system that facilitates process coordination in accordance with an aspect of the innovation

The innovation is now described with reference to the drawings, wherein the reference numerals are used to refer to the same elements throughout. Specific details are set forth in order to provide a thorough understanding of the proposed innovation. Well known structures and devices are shown in block diagram form in order to facilitate describing the innovation.

The terms 'component', 'device', 'unit', 'engine' and 'system' in this application are intended to refer to a computing-related entity, either hardware, a combination of hardware and software, software or software in execution. For example, a system may be running on a processor or a controller, a processor, an object, an executable, a program, and/or a computing component. Both an application running on a server and the server can be a system. One or more systems can reside within a thread of execution, and a system can be localised on one location and/or, distributed between two or more locations. Each of the physical components in the system (100), unless otherwise mentioned, is accompanied by a variable clock apiece.

The term temporal state in the context of the present application refers to a derivation in the time dimension. A temporal state, while having a duration may also have a resource value. The term processes in the context of the proposed innovation refers to operations microscopic through macroscopic scales that are either physical in nature, for example, wave propagations and energy transfers, or involving chemical transformations, or both. A process may comprise one or more other processes. The term operation refers to occurring of a process, either individually or in conjunction with any of the other selected process, and in the context of the present innovation the terms operation of process and process derive similar meanings unless otherwise mentioned.

The terms process coordinating and process coordination refer to obtaining and analysing the information on operation of a plurality of processes, microscopic through macroscopic scales, and establishing said information in terms of a common temporal basis in order to facilitate conducting these processes with optimum performance in a resource saving manner. For the purpose of the present innovation, the term obtaining information on processes refers to receiving and transferring said information for analysis. In the context of the present innovation, the term process environment refers to pluralities of processes wherein the plurality of information on their operation disclose interrelations and the patterns of the interrelations that commensurate with one or more identifiable outcome. While the processes in a process environment may or may not be in the one and same physical setting, the information of their operation as obtained by the novel instruments of the present innovation provides the rationale to be included, thus.

As set out for the purpose of outlining the present innovation, while the terms information and data derive similar meanings in the sense that both carry information, in the usage of the terms herein, however, information has been used to identify the contexts outside the system, i.e. before processing by the system, whereas the term data refers to contexts within the system, i.e. after processing. The term data handling encompasses transferring, processing, storing and communicating as an out put.

As used herein the terms to infer and inference refer generally to the process of reasoning about or inferring states of the process environment, and/or from a set of observations, as captured through events and/or information. Inference may be employed to identify a specific context or action, or, for example, can generate a probability distribution over states. The inference can be probabilistic, or the computation of a probability distribution over states, based on a consideration of information gathered. Inference may also refer to instruments employed for composing higher level action from a set of information. Such inference results in the construction of new actions from a set of observed and/or stored information, irrespective of whether they are correlated in close temporal proximity or not, and whether they originated from one or several sources.

In the context of the present innovation, the instruments that utilise such inferences based on analyses of observed and/or stored information as a basis for new actions, for example, in process coordinating of an electric motor, seek the formulation of these bases for action beyond the limitations in identifying the interrelations of the processes posed by predetermined formalisations. While recognising that these formalisations provide insights into the interrelations and their patterns, for example, behavioural patterns of different charged particles and/or wave propagation (e. g. the energising coils and in the rotating central core in a motor and in the electromagnetic radiation beam in an Infrared based device) commonly understood to be due to the different reference frames, deriving from theoretical framework provided by the theories on relativity, it must be mentioned, that it has been a challenging task, so far, to utilise them to formulate such a wide range of interrelations and their patterns for action in order to optimise resource usage and outcome. This is evidenced through the rather limited usage of such formalisations (e.g. formalisations deriving from theoretical framework provided by the theories of relativity) in incorporating these interrelations into the present designs and operation of applications based on electromagnetism (e.g. electric motors), for instance.

Reference the drawings FIG. 1 illustrates a system (100) that coordinates a plurality of predetermined processes in a process environment (001). As revealed in FIG. 1, the system (100) includes a process coordinating component (101) that is connected with a plurality of sources (150) at the respective operational units (300) in the process environment (001) for obtaining information on a plurality of such processes in order to facilitate conducting process coordinating. As the FIG. 1 illustrates the process coordinating component (101) further comprises a computing component (250) that employs a plurality of statistical and probabilistic analytical engines (SPAE) (275) for processing information obtained through the sources (150) in order to conduct process coordinating. The process coordinating component (101), as shown in FIG. 1, is further connected to a plurality of activating components (280) that transfer instructions formulated by the computing component (250) and the statistical and probabilistic engines (SPAE) (275) to a plurality of respective controlling components (290) that initiate and interrupt selected operations at the corresponding operational units (300).

One major overall goal of the present innovation is to enable the system (100) to establish a common temporal basis for operation of a plurality of selected processes in the process environment (001) including those occurring in durations lesser than the shortest variable of the variable operational step of said system (100) such as facets of electromagnetism and electromagnetic radiation, in order for said system (100) for facilitating coordinating these processes effectively with optimum performance in a resource saving manner.

In accordance with the present innovation, as illustrated in FIG. 1, the novel techniques adopted therein facilitate obtaining information on a plurality of processes in the process environment (001) for conducting process coordinating. As further shown in FIG. 1, the information on processes obtained through sources (150) is received at a plurality of communicating components (216) each accompanied by a punctuation incorporating component (217) coupled to a buffering component (230) in the process coordinating component (101) which also comprises of a switching component (155) that initiates the computing component (250) at receiving a signal from signaling component (225) upon information on the predetermined processes reaching the sources (150).

Figure 2:
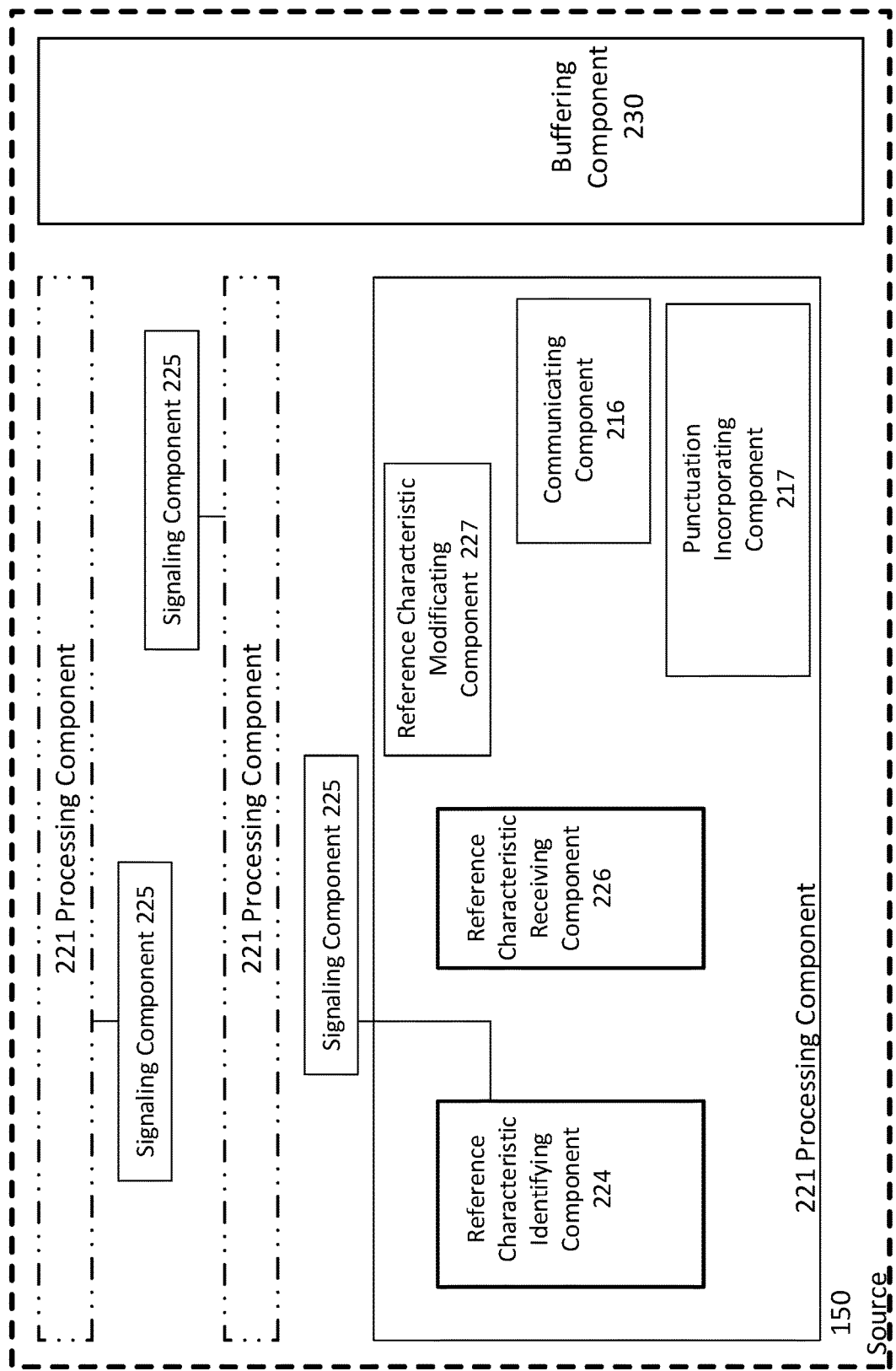
FIG. 2 illustrates a system that facilitates obtaining information on operation of processes from a plurality of sources in accordance with an aspect of the innovation

In one key aspect of the present innovation, as FIG. 2 illustrates, each of the sources (150) includes a plurality of processing components (221) and a buffering component (230) for transferring information on these processes based on the instructions by the computing component (250) and the statistical and probabilistic engines (SPAE) (275). As FIG. 2 further illustrates, each of the processing components (221) comprises a plurality of reference characteristic identifying components (224), signaling components (225), reference characteristic receiving components (226), reference characteristic modificating components (227), communicating components (216) each accompanied by a punctuation incorporating component (217). In accordance with the present innovation, a signal transferred from a signaling component (225) upon commencing of information reaching the component (224) is received at the switching component (155), initiating the computing component (250) and the statistical and probabilistic engines (SPAE) (275) of the process coordinating component (101) to establish commands for activating information obtaining at sources (150).

In one key aspect of the present innovation, the plurality of data received from the sources (150) on selected processes are analysed in terms of the variable operational step of the computing component (250) and the statistical and probabilistic analytical engines (SPAE) (275). In conducting process coordination, in accordance with the present innovation in a process environment, for example, in an electric motor, information on selected processes is obtained and analyses are made, including on transmission of electricity that, in turn, produces other facets of electromagnetism (e.g. magnetic fluxes, inductance, electromagnetic forces) and the angular velocity of rotor through sources (150) located at the respective operational units (300) (e. g. pluralities of segments in conducting coils and segments in rotor that create facets of electromagnetism and kinetic energy—angular velocity).

While activating obtaining information on selected processes the computing component (250) and the statistical and probabilistic analytical engine (SPAE) (275) analyse the selected pluralities of reference characteristics (e. g. amplitude and frequency of voltage pulses obtained as information on the process of varying concentration of ions, say, SO 4 2- ions, in an ionized media) of the respective information upon their receiving at the processing components (221) in order to establish the interrelations and the patterns of these interrelations of said characteristics of the information in terms of the variable operational step of said computing component (250). While the respective reference characteristics of the selected information are identified by the corresponding reference characteristic identifying components (224) and the respective characteristics are received by the relevant reference characteristic receiving components (226), in accordance with the present innovation, the computing component (250) based on the inferences by statistical and probabilistic analytical engines (275) initiates instructions for effecting a plurality of periodic interruptions with dynamically determined durations to each of said identifying by the respective characteristics by said components (224) and receiving by the corresponding characteristics by said components (226). In order to effect each of these interruptions, analyses of each of the identified characteristics by the respective components (224) and the transmissions of said characteristics between respective components (224) and the components (226) are conducted in terms of the variable operational step of the computing component (250).

In one key aspect of the present innovation, while each of the reference characteristics is identified by the relevant component (224) and received by the corresponding reference characteristic receiving component (226), the analyses are conducted based upon the inferences by statistical and probabilistic analytical engines (275) that establish the interrelations and the patterns of interrelations among similar analyses and their outcome, the computing component (250) instructs each of the reference characteristic modificating components (227) on the necessity and the extent to vary each of the corresponding references upon which the variable rate and the temporal extents of the analysing of each of the reference characteristics is based, as well as each of the durations at which the respective interruptions to transferring each of said characteristics from each of the processing components (221) as data to the process coordinating component (101) to be effected.

Based on the inferences of statistical and probabilistic analytical engines (SPAE) that utilise the interrelations and patterns of interrelations of the above analyses and their outcome, the computing component provides instructions to the respective reference characteristic receiving component (226) to transfer a signal to the communicating component (216) and its accompanying variable clock to formulate the data corresponding to the characteristics received at the component (226) for transferring through the buffering component (230), to the process coordinating component (101).

In formulating said data, in accordance with the present innovation, the computing component (250) and the statistical and probabilistic analytical engines (SPAE) (275) analyse the properties created upon receiving the information at the component (226) to be formulated as data, in order to establish the interrelations and the patterns of the interrelations of the respective characteristics in terms of their variable operational step for instructing the communicating component (216) to incorporate optimum electrical characteristics, including 'no electricity' characteristics and temporal characteristics and its accompanying punctuation incorporation component (217) to incorporate the punctuations with corresponding electrical and temporal characteristics.

In accordance with the present innovation, in formulating data with these optimum characteristics while optimising the supply of external electrical energy with specific temporal extents for the relevant components and their parts in the system (100) and with different combinations of characteristics (e. g. voltage, current), these novel instruments adopt the respective temporal extents of the interruption to and resumption of transmission of electricity, in order to diversify the bases of operation of data handling. In diversifying the bases of operation, these novel instruments utilise the multi-dimensional contributions of electricity in data handling in the system (100), namely, as a source of energy for operation of the system as well as in formulating data states and the punctuations with dynamically determined characteristics based on the temporal extents of interruptions to and supplying of external electrical energy with variable electrical characteristics in different scales including elemental units (510) and the pluralities of their compositions.

Thus, in one key aspect of the present innovation, these novel instruments utilise the periodic interruptions to supply of energy, i.e. electricity, as an instrument to diversify the bases of operation in data handling, in terms of the temporal dimension as well as in electrical characteristics. While the interruptions are of dynamically determined durations, these novel instruments adopt the time dimension and its units, derived from 'no electrical signal' durations, in order to diversify the bases of operation of data handling. In diversifying bases of data handling, the novel instruments adopted in the present innovation utilise supplying and interruptions to external electrical energy that facilitates specific electromagnetic properties as a multifaceted tool wherein these external electrical energy inputs are dynamically varied, based upon the analyses, that disclose the temporal extents and the electrical energy variations (e. g. increases and reductions) required for transition from one dynamically determined level of such properties (e. g. conductivity) to another dynamically determined level in each of the components and their parts in the system (100). These novel instruments, based upon the analyses conducted by the computing component (250) and the statistical and probabilistic analytical engines (275), maintain such properties in these units at dynamically determined levels (e. g. just below the lowest conductivity threshold level, high conductivity level, well below lowest conductivity threshold level) accounting for interrelations and their patterns of the temporal extents and the external energy as well as the properties of the electrical signals, including no electrical signals, that are utilised for conducting different aspects of data handling (e. g. converting, transferring, processing, communicating).

Broadening the bases of operation, in terms of the temporal dimension, as well as the electrical characteristics, facilitate expanding the possibilities and opportunities for more effective and energy efficient data handling which in turn enable improving coordination of processes.

In accordance with the present innovation, the punctuation incorporating component (217) coupled to the modified communicating component (216) provide the punctuations to each of the data by effecting variations in electrical characteristics for durations instructed by computing component (250) based on the inferences by the statistical and probabilistic analytical engines (SPAE) (275). These punctuations signify the start and end of the data states and enables error handling in data transfers as well as facilitating implementing logic functions in analyzing and processing data conducted by the computing component (250) based on the inferences by the statistical and probabilistic analytical engines (SPAE) (275). In one key aspect of the present innovation, similar to communicating components (216) in the system (100) that can perform sending and receiving the data, the punctuation incorporating components (217) assume both roles, namely, incorporate these punctuations in sending, and, lock them in receiving data states. While the component (217) is performing both these tasks, the terms punctuation incorporating component and the punctuation locking component are used herein, to distinguish the specific task in relation to the stage of data handling. Since it is evident that when a communicating component (216) is engaged in a task in data handling in the system (100), a punctuation incorporating component (217) is associated with it, it is not mentioned in describing more complex contexts in the application of the present innovation.

The punctuations, mentioned supra, are effected by the punctuation incorporating component (217) that accompany the communicating component, each connected to a variable clock by incorporating dynamic variations in punctuation intervals, while effecting variations of electrical characteristics for dynamically determined temporal extents of not less than that of variable operational step of the modified communicating components, based on the instructions by the computing component (250) derived upon the inferences of the statistical and probabilistic analytical engines (SPAE) (275).

In error handling in these transfers from sources (150) to component (101), the computing component (250) and the statistical and probabilistic analytical engines (SPAE) (275) receive a signal from the communicating component (216) in the process coordinating component (101), whether the specific transfer that includes the interruptions and each of specific punctuations that correspond to the start and end of each of said interruptions has been received. The computing component (250) and the statistical and probabilistic analytical engines (SPAE) (275), in turn, instruct the transmitting communicating component (216) in the processing component (221), on the necessity of reconducting the transfer to ensure that the specific data transfer is complete.

In accordance with the present innovation, these novel instruments utilising the novel features of obtaining information, mentioned supra, incorporate said transmission of different characteristics of information (e. g. transmission of different characteristics of information on electromagnetism in a plurality of segments in conduction media in an electric motor, transmission of different characteristics of information on wave propagation in an Infrared based device) as processes in a specific process environment. Since a plurality of transmission of information (e. g. transmission of information on magnetic flux in a motor coil as voltage pulses, transmission of information on Infrared wave propagation in an Infrared based device as voltage pulses) occur in temporal extents lesser than the shortest variable of operational steps of the computing component (250), in one key aspect of the present innovation, the novel instruments facilitate their incorporation as quantifiable entities in said process environments by effecting periodic interruptions to said obtaining information based upon the variable operational step of the computing component (250) and the statistical and probabilistic analytical engines (SPAE) (275) which, in turn, enables establishing robust bases for process coordinating across a wide range of different scales and applications.

Since each of the selected processes in a subject process environment (001) is closely associated with the corresponding information on its operation, as mentioned supra, in one key aspect of the present innovation, these novel instruments by formulating said transmission of information that occur in temporal extents lesser than the shortest variable of operational steps of the computing component (250) as measurable entities in terms of the common temporal basis that adopts the variable operational step of the computing component (250) and the statistical and probabilistic analytical engines (275) outline a framework for establishing said corresponding processes that take place in similar temporal extents that are lesser than said shortest variable of operational steps of the component (250) as quantifiable entities in terms of said common temporal basis as well.

In the fields related to process coordinating such as classical and quantum mechanics, it is among the well established principles to identify activities and processes in relation to time. In classical physics literature, while highlighting that it does not provide a 'fixed' backdrop, time is understood as a vital aspect in both non relativistic and relativistic situations. In the field of quantum mechanics, while making major advances in establishing formulations that broaden the understanding of the key properties, as well as the probabilities of the microscopic scale 'actors' and 'agents' assuming these properties, attributing for time has been part of well established principles among the different schools of thoughts associated with the discipline. It is evident, thus, that the temporal dimension has widely been considered a vital aspect in formulating bases in processes in microscopic through macroscopic scales.

In one key aspect of the present innovation, in order to facilitate establishing these processes on a common temporal basis, as mentioned supra, the variable operational step of the computing component (250) and the statistical and probabilistic analytical engines (SPAE) (275) is adopted for the analysis of information on said processes in the subject process environment (001). The novel instruments that conduct these analyses adopting the variable operational step of the computing component (250) and the statistical and probabilistic analytical engines (SPAE) (275), in accordance with the present innovation, formulate the interrelations and their patterns among said information on the respective processes based on said common temporal basis in order to derive the corresponding interrelations among the respective processes as well.

In situations where each of the reference characteristic identifying components (224) and each of the reference characteristic receiving components (226) in obtaining information on specific processes adopting the shortest variable of the operational step of the computing component (250) and the statistical and probabilistic analytical engines (275) the specific operations are complete (e. g. transmission of Infrared beam within a device), such processes are determined, for the purpose of the present innovation, to have occurred in temporal extents shorter than the shortest variable of said operational step of the component (250).

In order to utilise the interruptions to obtaining information for establishing said interrelations and their patterns (e. g. interruptions to obtaining information on a transmission of external electrical supply in conducting coils in a motor) the interrelations and their patterns among the plurality of information on the predetermined associations among the selected processes (e. g. magnetic flux, induction, electromagnetic forces and angular speed of rotor in a motor predetermined as associated processes with transmission of external electricity in a motor, variations in ionized media predetermined as an associated process with transmission of electromotive force in an electrochemical cell), in one key aspect of the present innovation, are established while each of the processes of which obtaining information is to be interrupted (e. g. transmission of electricity, transmission of Infrared beam) is in operation based upon the variable operational step of the computing component and the statistical and probabilistic analytical engines (SPAE). Similarly, a plurality of information on said associated processes is obtained and analyses are conducted, in accordance with the present innovation, during each of these periodic interruptions to each of the selected obtaining information of the selected processes (e. g. supply of electricity to selected operational units of an electric motor, transmission of Infrared beam in a device) that occur in temporal extents shorter than the shortest variable of the variable operational step of the computing component and the statistical and probabilistic analytical engines. In one key aspect of the present innovation, these novel instruments that conduct analysis of the plurality of information on selected processes utilise the interrelations and their patterns among information during these periodic interruptions to selected obtaining information as well as said close association between each of the plurality of processes and the corresponding information for formulating the interrelations and their patterns among the selected processes including those that occur in temporal extents lesser than the shortest variable of said operational step of the component (250) (e. g. transmission of external electrical energy in a motor, transmission of an Infrared beam in a device) and their selected associating processes (e. g. angular speed in a motor, activating a device upon receiving an Infrared signal) in a subject process environment.

As mentioned supra, these novel instruments effect interruptions to each of a plurality of obtaining information on selected processes in order to incorporate said processes into a common temporal basis, based upon the variable operational step of the computing component and the statistical and probabilistic analytical engines to facilitate coordinating processes. Based on the analyses of the interrelations and their respective patterns, in accordance with the present innovation, the novel mechanisms therein facilitate formulating interrelations of selected associating processes (e. g. magnetic flux in stator—rotor air gap, motor speed in a motor) in relation to each of the temporal extents of such periodic interruptions to obtaining information on each of the selected processes that occur in durations lesser than said shortest variable of the operational steps, in terms of a common temporal basis that adopts the variable operational step of the computing component (250) and the statistical and probabilistic analytical engines (275).

As the interrelations between the temporal extents of each of these interruptions and the required operational standards (e. g. continuity in kinetic energy output for maintaining required angular velocity of rotor in an electric motor, the continuity in information handling maintaining required Infrared based data transfer) in the subject process environment are established, these novel instruments facilitate determining the respective periods for which the selected operations in the process environment (e. g. angular speed of rotor in an electric motor) remain within the required operational levels during each of the interruptions to the respective processes (e. g. supply of external electricity) as well. In one key aspect of the present innovation, each temporal extent of the respective operations and the corresponding interruptions derived from the interrelations and their patterns among the selected associated processes (e. g. each temporal extent of supplying and interruptions to electricity to different segments of conducting coil in a motor derived from the respective interrelations with the magnetic flux, electromagnetic force and angular speed of rotor) are established as collectives of the temporal states established in terms of the variable operational step of the computing component (250) and the statistical and probabilistic analytical engines (275).

These novel instruments adopted in the present innovation formulating the collectives of temporal states of the interruptions to each of these selected processes (e. g. supply of electrical energy to a motor, transmission of Infrared beam in an information management device) as derived through the interruptions to obtaining corresponding information based on the variable operational step of the computing component and the statistical and probabilistic analytical engines facilitate the incorporation of said processes into the process environment with quantifiable temporal extents of its own operation as well as quantifiable interrelations with selected associating processes in the specific process environment. As quantifiable entities incorporated in the subject process environment (100), the collectives of the respective temporal states of these operations (e. g. supply of electrical energy to a motor, transmission of Infrared beam in an information management device) disclose interlinks with the corresponding extents (e. g. values of voltage in the rotor, values of magnetic flux in the gap between stator and rotor, angular speed of rotor) of the associating processes (e. g. magnetic flux, transmission of electricity due to induction, electromotive force, angular speed of rotor) in the context of the specific process environment (e. g. an electric motor, Infrared based camera), since, in accordance with the present innovation, the analyses and establishing interrelations are conducted upon a common basis, namely, the variable operating step of the computing component (250) and the statistical and probabilistic analytical engines (275).

In one key aspect of the present innovation, these novel instruments facilitate adopting the temporal extents of the interruptions to the selected processes, derived from interruptions to transfers of corresponding information, that occur in durations lesser than the smallest variable of the operational step of the computing component (250) (e. g. transmission of electricity, transmission of Infrared beam) as a basis for quantifying of the processes identified as associating processes (e. g. inductance, electricity due to inductance, electromagnetic force, angular speed of rotor as associating processes of transmission of electricity in a motor) and their corresponding durations of operation in the context of the specific process environment (e. g. operation of an electric motor, Infrared based information processing in an Infrared camera). In accordance with the present innovation, establishing temporal extents in selected operations (e. g. transmission of electricity to a motor, transmission of electrochemical potential of a lead-acid cell as electromotive force to a circuit) in relation to these associated processes and their corresponding collectives of temporal states, formulated in terms of a common basis, namely, the variable operational step of the computing component (250) and the statistical and probabilistic analytical engines (275) facilitates incorporating and expressing them based upon a common temporal and resource framework.

In accordance with the present innovation, these novel instruments that formulate a wide range of processes (e. g. transmission of electricity, creating induction and electromagnetic force, angular velocity in a motor) in a process environment based upon a common temporal and resource framework facilitate disclosing differentiations in temporal states and a selection of resource utilisation and outcome in a robust manner across different energy forms, time scales and behavioural patterns of different 'actors and agents', microscopic through macroscopic scales. By establishing them based upon a common temporal and resource framework, the novel approaches adopted in the present innovation disclose, among other aspects, the differentiations in temporal states among selected processes (e.g. differentiations among temporal states of external supply of electricity to a motor and the creation of electromagnetic forces in the rotor and stator as well as at a different temporal scale, the angular movement of rotor due to electromotive forces) during their operation.

By incorporating operation of microscopic through macro scale processes based on a common temporal and resource framework, in one key aspect of the present innovation, these novel instruments facilitate conducting process coordination at the respective operational units across different scales (e. g. segments of different scales in the conduction media—conducting coils—at which the facets of electromagnetism in an electric motor are created, segments in the electrodes in an electrochemical cell) associated with the interrelations and their patterns of said processes in the process environment. In accordance with the present innovation, the novel instruments adopted therein while identifying these associations at the respective operational units of different scales facilitate approaching the smallest operational units in the respective process environments (e. g. a segment in a conduction media in an electric motor, a segment in an electrode in a lead acid cell, an elemental unit (510) in a semi conductor based component in an Infrared based camera) as independent and quantifiable operational entities in conducting process coordination.

These novel instruments, by approaching the smallest operational units as independent entities in relation to the specific context of the process environment and by adopting the temporal states derived from the variable operational step of the computing component and the statistical and probabilistic analytical engines, in one key aspect of the present innovation, expand the basis for process coordinating. By approaching these operational units as quantifiable entities and adopting the temporal states based upon the variable operational step of the computing component (250), these novel instruments adopted in the present innovation facilitate formulating the interrelations and their patterns of the selected processes in relation to each of these units (300) and their compositions in a scalable manner expanding the bases for process coordination. As these interrelations and their patterns are formulated in relation to different compositions (e. g. material and physical compositions) of the operational units in different scales, the novel instruments adopted in the present innovation enable establishing a basis for identifying each of said compositions that operates as required for different operational requirements in process environments wherein the processes such as, but not limited to different facets of electromagnetism and electromagnetic radiation (e.g. different material and physical compositions of conducting coils in electric motors that retain facets of electromagnetism such as magnetic flux in different temporal extents upon interruption to supply of electricity with different electrical properties, different material compositions of elemental units (510) that transit from one level of predetermined electromagnetic properties to another in different temporal extents upon interruption to supply of external electrical energy with different electrical characteristics).

Figure 3A:
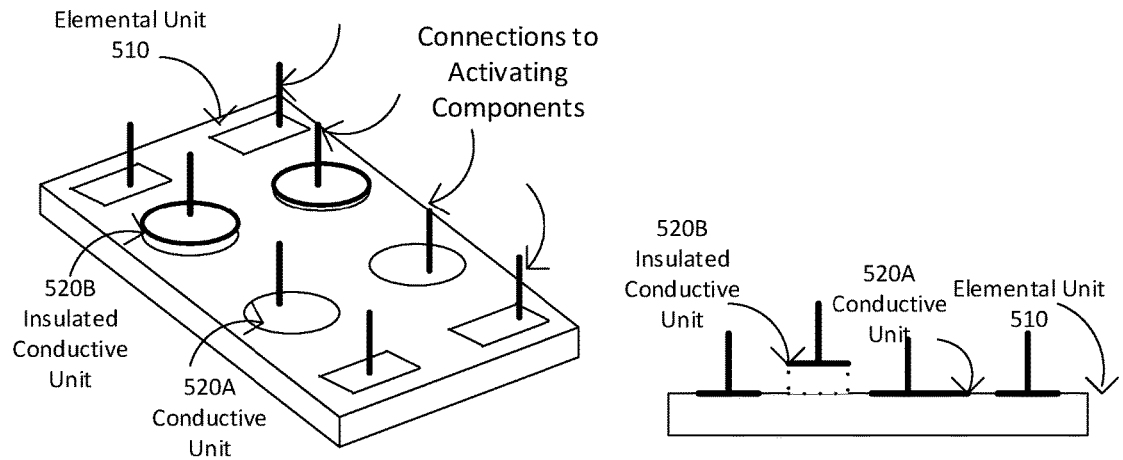
FIG. 3A illustrates a schematic representation of the smallest scale units, the elemental unit and the conductive unit and the insulated conductive unit that facilitate process coordination in accordance with an aspect of the innovation
Figure 3B:
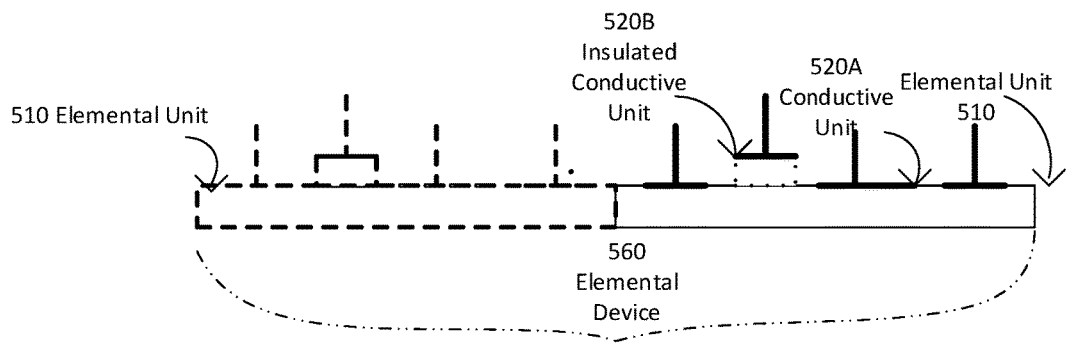
FIG. 3B illustrates a schematic representation of one of the smallest scale components, the elemental device that facilitates process coordination in accordance with an aspect of the innovation
Figure 3C:
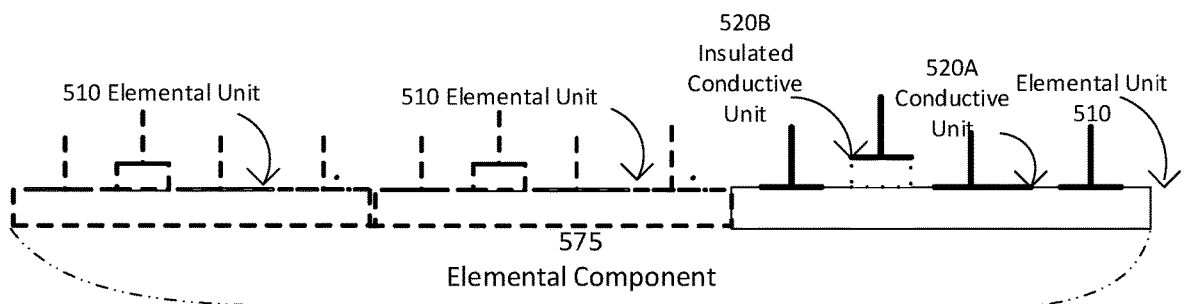
FIG. 3C illustrates a schematic representation of one of the smallest scale components, the elemental component, that facilitates process coordination in accordance with an aspect of the innovation

As obtaining information on the processes in a process environment is closely interlinked with other associated processes, including the respective constituent implements in the components and devices associated with said obtaining information establishing predetermined levels of electromagnetic properties (e.g. conductive and non-conductive properties) respectively for quantifiable temporal extents, and also with other selected processes (e.g. current gain-bandwidth corresponding to a fixed voltage and the respective charge carriers, for example, electrons receiving required energy quanta) in one key aspect of the present innovation, these novel instruments facilitate formulating interrelations and their patterns among these selected processes (e.g. conductive and non-conductive properties in a semi conducting unit) at different scales. In one key aspect of the present innovation, the different scales at which these novel instruments coordinating the processes include the elemental units (510), the conductive units (520A), the insulated conductive units (520B), the elemental devices (560) and the elemental components (575) as illustrated in FIGS. 3A, 3B and 3C as well as their pluralities and combinations that form devices and components being utilised in different process environments, including, but not limited to switching and signal amplifying for facilitating formulation of these robust bases and expanding the scope of process coordination.

By facilitating establishment of the interrelations and their patterns at these scales, the novel instruments adopted in the present innovation enable formulating a basis for approaching the smallest units such as the elemental unit (510), the conductive unit (520A) and the insulated conductive unit (520B) as independent operational entities. By approaching these smallest operational units as independent entities, in accordance with the present innovation, these novel instruments establish a plurality of dynamically determined levels of respective electromagnetic properties (e.g. conductivity and non-conductivity levels) in each of the elemental units (510), conductive units (520A) and insulated conductive units (520B) and their compositions in different process environments, for example, those related to transmission of energy (e.g. electrical energy) as well as transmission of information (e.g. electrical signals related to transmission of Infrared signals as data) in order to expand the bases of process coordination.

In one key aspect of the present innovation, each of the elemental units (510), each of the conductive units (520A) and each of the insulated conductive units (520B) is connected to at least one of the plurality of activating components (280) that operate based upon the instructions of the computing component (250) and the statistical and probabilistic analytical engines (275) for effecting variations in external supply of electrical energy to said units (510, 520A and 520B) in order to create dynamically determined levels of selected electromagnetic properties (e.g. electrical conductivity). The novel instruments, in accordance with the present innovation, utilise these connections of each of these units (510, 520A and 520B) with each of the plurality of components (280) for supplying external electrical energy, in different combinations of electrical characteristics for dynamically determined temporal extents to enable each of these units and its compositions attaining dynamically determined levels of pre-selected electromagnetic properties, in order to effect interruptions and resumption of transmission of signals in different facets of electromagnetism as required for process coordination in respective process environments.

Whereas these units (510, 520A and 520B) can be processed making use of a suite of widely adopted technologies that exploit the properties of semi conducting materials by enabling them attaining different levels of electromagnetic properties upon supply of different extents of external electrical energy for different temporal extents, in accordance with the present innovation, the novel instruments adopted therein dynamically establish the interrelations and their patterns of each of the pluralities of combinations of properties in supply of external electrical energy (e.g. current, amplitude of voltage) and the corresponding aspects related to levels of electromagnetic properties at each of these units and their respective pluralities and compositions. These interrelations and their patterns include, but, not limited to the temporal extents related to a plurality of transitions from each of the predetermined levels of specified electromagnetic properties to another level in said units (510, 520A, 520B) which, in turn, determines the transmission of the signals in respective facets of electromagnetism based upon the variable operational step of the computing component (250) and the statistical and probabilistic analytical engines (275).

In accordance with the present innovation, the shortest variable of the operational steps of the computing component (250) and the statistical and probabilistic analytical engines (275) is lesser than the shortest temporal extent of transition from each of the dynamically determined levels of electromagnetic properties to any other dynamically determined level of such properties in each of these units (510, 520A and 520B) as instructed by the component (250) in the process environment.

Since each of these units attain different levels of specified electromagnetic properties upon supply of external electrical energy, the novel instruments adopted in the present innovation dynamically configure a plurality of such units by electrically interconnecting them by supplying external power and varying the combinations in these interconnections as well as the electrical characteristics in power supply at dynamically determined temporal contexts, utilising the activating components (280) that operate based on the instructions of the computing component (250) and the statistical and probabilistic analytical engines (275).

In one key aspect of the present innovation, in relation to each of the different combinations of characteristics in electrical energy supply for each of the durations, these novel instruments facilitate establishing bases for identifying the respective material compositions in these units (510, 520A and 520B) that demonstrate a plurality of predetermined behavioural patterns (e.g. transition among different levels of electrical conductivity upon different combinations of electrical properties in external supply of power) in different contexts. Utilising the bases, for example, these novel instruments facilitate identifying the different compositions of the materials that provide a range of required levels of specific electromagnetic characteristics in these units, including, but not limited to transition from a predetermined high conductivity level to a predetermined low conductivity level, along with the related processes (e.g. attaining current gain-bandwidth corresponding to a voltage) within different temporal extents. In accordance with the present innovation, these novel instruments, thus, provide the framework that enable producing each of these different types of units and their combinations with necessary material and physical compositions to achieve the transitions among predetermined electromagnetic property levels in different durations in relation to each of the plurality of combinations of electrical properties in external electrical supply, as required in the respective operational contexts.

These bases facilitated by the novel instruments adopted by the present innovation also enable formulating the interrelations of the temporal extents in establishing the predetermined levels of electromagnetic properties (e.g. electrical conductivity) for each of the different combinations of electrical properties for different temporal extents in supply of external energy in relation to the respective material compositions of these elemental units, which, in turn, constitute elemental devices (560) and elemental components (575) in addition to utilising them in forming different components as well as for making use of them in different applications and operational contexts. Thus, the novel techniques adopted in the present innovation as well provide a basis for identifying different combinations of material compositions that bring about the properties related to temporal extents of establishing different levels of specified electromagnetic properties (e.g. temporal extents of maintaining predetermined conductivity levels upon variations in supply of electrical energy in its different combinations of characteristics for different durations for each type of material composition) as well as the temporal extents of transitions from one such level to another while providing a framework in selecting different materials and their respective combinations, such as, but not limited to chemical and physical combinations and proportions in composing these elemental units (510) and conductive units (520A) and insulated conductive units (520B) as well as their pluralities to suit respective operational contexts.

Since these novel instruments facilitate providing each of the elemental units, conductive units and insulated conductive units and their combinations with external electrical energy in different combinations of electrical characteristics and in different temporal extents for attaining different predetermined levels of electromagnetic properties in the configurations of these units that enable transmission of signals of electromagnetism and interruptions to their transmission, in accordance with the present innovation, they also enable utilizing said units and their combinations in a wide range of applications related to processes including obtaining information on operation of the selected processes in a process environment.

As per the applications related to process coordination, in accordance with the present innovation, the elemental units (510) are configured to form elemental devices (560) and elemental components (575) which, in turn, constitute the components and other devices for specific temporal extents dynamically determined by the computing component (250) based on the inferences of the statistical and probabilistic analytical engines (275) in relation to the tasks and the roles of these configurations across different scales (e.g. elemental devices and elemental components, components). In one key aspect of the present innovation, these novel instruments analyse the overall tasks (e.g. facilitating the supply of a high quantum electrical energy for an operational unit, transfer of a group of data) and formulate the structure and organisation of the dynamically formulated electrical and temporal characteristics of each of the plurality of electromagnetic signals that require passing through each of these units in such configurations and each of the durations between such signals in carrying out these overall tasks in determining each of these configurations of the smallest units, namely, the elemental unit (510), the conductive unit (520A) and the insulated conductive unit (520B) as well as the required external electrical energy and the temporal extents for energizing.

In accordance with the present innovation, these novel instruments, based on the interrelations and their patterns of the temporal extents of each of the transitions from one predetermined level of specified electromagnetic properties to another (e.g. high conductivity level to just below threshold of cut off level for conductivity) within and among these units, dynamically formulate the optimum configuration required for each of the transmissions of electromagnetic signals, in relation to the plurality of said transmissions to conduct the overall task, mentioned supra. By formulating each of the configurations of these units for the specific characteristics of each of said signals within a group and the durations between two of such signals that would be transferred to carry out the overall task, based upon the instructions of the computing component (250) that derive from the inferences of the statistical and probabilistic analytical engines (275), in one key aspect of the present innovation, these novel instruments expand the bases for coordinating processes adopting the optimum resources (e.g. number and structure of the units in these configurations, composition of electrical characteristics) as well as effectiveness in conducting each of its tasks (e.g. data formulation, transmission of high current electrical signal). In dynamically establishing the optimum configurations of these units and the optimum electrical and temporal characteristics, these novel instruments utilise the respective properties in relation to the transition from one level of predetermined electromagnetic properties to another level upon the different electrical and temporal characteristics in supply of external electrical energy in each of these units (e.g. the elemental units, the conductive units and the insulated conductive units). For example, a small temporal extent for transition from the no conductivity level to conductivity with a small external electrical energy input for a short duration as well as upon its interruption reverting in a short transition period back to the no conductivity state in these compositions of elemental units in combinations with pluralities of conductive units (520A) and insulated conductive units (520B) would be the properties of amplifying electrical signals adopted for providing high quantum electrical energy in short temporal extents interspersed with interruptions to selected operational units (300) (e.g. segments of conducting coil) in an electric motor, in accordance with the present innovation.

An elemental unit, either individually or in combination with other elemental units in a grouping, may derive an electrical functionality (e.g. negative, positive, source) for a specific temporal extent, and receive external electrical energy through conductive units (520A) that conduct electrical charges and insulated conductive units (520B) that create electrical fields respectively, comprising dynamically determined electromagnetic properties for specific durations, in terms of the instructions by the computing component based on the inferences of the statistical and probabilistic analytical engines. The configurations of elemental devices (560), each comprising two or more groupings of such elemental units, and the elemental components (575) comprising three or more such groupings of elemental units, based on the instructions of the computing component wherein each of said groupings assumes an electrical functionality different to that of such groupings electrically interconnected with it while the required external electrical energy inputs are provided through selected pluralities of conductive units (520A) and insulated conductive units (520B) to establish the dynamically determined levels of properties that facilitate establishing required levels of electromagnetic properties, in order for such elemental devices (560) and elemental components (575) to make interruptions to and resumption of transmission of electromagnetic signals.

In one key aspect of the present innovation, these novel instruments, upon supply of dynamically determined electrical energy inputs at each of these groupings of elemental units in the elemental devices and in the elemental components respectively enabling them attain the dynamically determined electromagnetic property levels, based on the comparisons with previous analyses of the respective properties, utilise these devices (560) and components (575) and their pluralities to transmit electromagnetic signals with dynamically determined characteristics for a wide range of applications.

Since the novel instruments adopted in the present innovation facilitate each of the groupings of elemental units assuming dynamically determined electrical functionalities (e.g. negative, positive, source) with dynamically determined levels of respective electromagnetic properties for variable temporal extents, the configurations of the elemental devices and the elemental components as well as their functions and capacities for transmitting electromagnetic signals can be optimised improving the utilisation of resources and outcome as well. In optimising the resources and outcome, in accordance with the present innovation, utilising the activating components (280) the novel instruments adopted herein dynamically activate and deactivate the electrical interconnectivities of each of the elemental units associated with the respective dynamically formulated configurations of elemental devices and elemental components in order to maintain the optimum level of electromagnetic properties (e.g. just below threshold of conductivity, high conductivity) at each of said units, as determined by the computing component (250) based on the inferences of the statistical and probabilistic analytical engines (275).

The novel techniques adopted in the present innovation in dynamically configuring the elemental devices (560) and elemental components (575) facilitate their constituent groupings of elemental units (510) assume respective electromagnetic properties, including respective electrical functionalities upon supply of external electrical energy through combinations of respective pluralities of conductive units (520A) and insulated conductive units (520B). In configuring these elemental devices (560), elemental components (575) and their combinations, based upon the analyses, these novel instruments supply external electrical energy with the required combinations of electrical and temporal characteristics through the respective activating components (280) to each of the conductive units (520A) and the insulated conductive units (520B) in the dynamically formulated configurations, in order to establish respective electromagnetic property levels (e.g. just below threshold of conductivity) with dynamically determined properties for dynamically determined temporal extents. In one key aspect of the present innovation, as each of the conductive units (520A) and the insulated conductive units (520B) are connected to one or more elemental units (510) that are configured in their groupings with dynamically determined electrical functionalities for forming the elemental devices (560) and elemental components (575), the novel techniques adopted in the present innovation dynamically determine the specific numbers, compositions and temporal extents of said conductive units and insulated conductive units to be utilized, in order for establishing the dynamically determined levels of electrical properties that facilitate transmission of electromagnetic signals and the interruptions to such transmissions.

In one key aspect of the present innovation, in different operational contexts (e.g. information handling, energy management) deriving from the increased possibilities of combinations of supply of external electrical energy for dynamically determined temporal extents with variable electrical characteristics, these novel techniques formulate greater operational opportunities for each of the elemental units and their different formations that combine to formulate each of the electrical functionalities (e.g. source, negative, drain, positive, gate, base) assisted by the combinations of respective conductive units to assume a plurality of functions according to different requirements and applications, based on the instructions by the computing component and the statistical and probabilistic analytical engines. Based upon that, in accordance with the present innovation, each of the elemental devices, elemental components and their scalable combinations are able to assume multi functional roles as well, since the novel instruments therein utilise the varying temporal and other related characteristics in establishing the predetermined levels of respective electromagnetic properties in the constituent elemental units in pluralities of combinations, upon being supplied with electricity in a variety of combinations of electrical characteristics (e.g. voltage, current) for different temporal extents, thus enabling optimising the types, numbers and permutations in corresponding temporal extents in the operation of respective components and their parts. Dynamically formulating each of the plurality of electromagnetic signals in relation to the specific applications, in one key aspect of the present innovation, in terms of the minimum required energy levels, with optimum time intervals between such signals facilitate creating these greater operational opportunities, as the novel instruments adopted in the present innovation formulate the configurations of these units and transmission of said signals maintaining the optimum electrical energy levels in such units (e.g. threshold conductivity level in elemental units, threshold electrical field emitting level in insulated conductive units) engaged in each of said signal transfers as well as those units not engaged in said transfers at the required levels for the required temporal extents, thus avoiding electrical energy leakages, that cause errors and energy losses at these smallest scales as well.

The novel instruments in the present innovation, adopting the temporal extents of these interruptions to supply of external electrical energy utilise return electrical charge produced upon each of these interruptions at the elemental units, the respective conductive units, the corresponding elemental devices and the elemental components as well as at various components comprising them to provide at least part of the external electrical energy required for operation of other such units, devices and elemental components. These novel techniques adopting the activating components (280) that operate in variable operational steps that have shorter variables than the temporal extents of transition among dynamically determined levels of electromagnetic properties in the elemental units and their combinations, based upon the instructions and inferences of the computing component (250) and statistical and probabilistic analytical engines (275), direct these 'return electrical charges' due to the interruptions to the electricity supply, to other selected elemental units, conductive units, elemental devices, elemental components and parts of components, upon assessing their respective energy requirements and the corresponding properties of these return electrical charges.

Similarly, in other applications of the present innovation associated with 'return electrical charges' in different scales, including electric motors, the novel instruments direct them for other sections, (e. g. operational units, process coordinating system components) of the process environment as supply of electricity.

By facilitating employing a scalable unit of analysis for formulating interrelations and their patterns of the selected processes these novel instruments adopted in the present innovation enable establishing a basis for identifying the respective collectives of operational units of each type (e. g. extent and locations of segments of the conduction media in an electric motor to be energized for obtaining the required kinetic energy level in the rotor for the specified temporal extent) required for maintaining the operational standards in the process environment. By employing a scalable unit of analysis for process coordinating, these novel instruments adopted in the present innovation facilitate an entire range of novel operational features and outcome at microscopic scale of composing (e.g. chemical compositions in smallest operational units—smallest segments of conducting material in an electric motor that facilitate greater temporal extents of maintaining respective levels in each facet of electromagnetism upon the interruptions subsequent to different combinations of electrical and temporal properties in supply of power) and formulating interrelations at these operational units and their scalable compositions as well as their applications in different contexts including in handling the information in coordinating of processes.

In accordance with the present innovation, these novel techniques that adopt these interruptions to the obtaining information as well as processes in the subject process environment as mentioned supra, that are effected at microscopic scale (e. g. elemental unit, conductive units) facilitate establishing interrelations and their patterns with selected processes that occur in microscopic scales (e. g. quantified extents of molecules reformulating their respective electromagnetic bonds in selected chemical reactions such as forming $H_2O$ and $SO_4 2-$ in an ionized media) upon a common temporal basis that adopts the variable operational step of the computing component (250) and the statistical and probabilistic analytical engines (275). These dynamically established interrelations and their patterns among the respective temporal states of different processes, including those in microscopic scales in a process environment enables utilising the differentiations of said temporal states and their patterns for a wide range of applications and purposes.

Applications of some of the abovementioned key aspects of the present innovation can be further illustrated while emphasising that by no means they are exhaustive or defining or confining the scope of its applicability.

As mentioned above, in one key aspect of the present innovation, in obtaining information on a plurality of processes for coordinating processes in the process environment (001) (e. g. an electric motor, an electrochemical cell) commencing said obtaining of the respective information occur upon receiving signals from the relevant signaling components (225) in the sources (150) by the process coordinating component (101). While initiating obtaining information on selected processes the computing component (250) and the statistical and probabilistic analytical engines (275) analyse the selected pluralities of reference characteristics of each of the plurality of information upon their receiving at the respective characteristic identifying components (224) in the processing components (221) of the sources (150) in order to establish the interrelations and the patterns of these interrelations of said characteristics of the information in terms of the variable operational step of said computing component (250).

In obtaining information for coordinating processes in a process environment such as an electric motor, in one key aspect of the present innovation, a plurality of characteristic identifying components (224) in the sources (150) identify the respective characteristics of a plurality of information on selected processes including voltage, frequency and current in the external supply of electricity, magnetic flux, inductance, transmission of electricity in selected operational units (300) due to inductance and electromagnetic forces and facets of kinetic energy (e. g. angular velocity) at kinetic energy based operational units (e. g. flywheel of the motor, pulley of motor).

The novel techniques, in accordance with the present innovation, thus obtain information at the respective sources (150), identified by corresponding reference characteristic identifying components (224) and received by the respective reference characteristic receiving components (226), based on the instructions of the computing component (250) and the statistical and probabilistic analytical engines (275). In accordance with the present innovation in a process environment such as an electric motor, information on magnetic flux due to flow of electricity externally supplied to dynamically determined operational units (300) (e. g. segments of conducting coils or similar segments), on inductance as well as on properties of electricity in the selected operational units (e.g. electromagnetism based operational units in the stator and in central core-rotor-of an electric motor) of the sections due to thus established inductance, as well as the resulting magnetic flux at the respective locations, among other selected associating processes are obtained, mentioned supra. The resulting electromagnetic forces at selected operational units (300)—segments of rotor & stator—in the process environment and the facets of kinetic energy (e. g. angular velocity), as well as the resistance in the selected operational units (300)—segments of coils—are also gathered in terms of the variable operational step of the computing component and the statistical and probabilistic analytical engines, in order to facilitate analysis and identifying interrelations and their patterns among selected processes. Methods and instruments for obtaining the respective values of magnetic flux, inductance, electromagnetic force as well as voltage, current, frequency and resistance in order to identify and receive their respective characteristics as required for the applicability in the present innovation by a plurality of components (224) and components (226) in terms of the variable operational step of the computing component (250) are commonly available in the market and can also be found in published literature.

In obtaining information for conducting process coordinating in a process environment such as an electric motor, in one key aspect of the present innovation, a plurality of characteristic identifying components (224) in the sources (150) identify the respective characteristics of a plurality of information on selected processes including voltage, frequency and current in the external supply of electricity to selected operational units (300), magnetic flux, inductance, transmission of electricity in said operational units (300) due to inductance and electromagnetic forces and facets of kinetic energy (e. g. angular velocity) at kinetic energy based operational units (e. g. flywheel of the motor, pulley of motor).

In accordance with the present innovation, utilising its novel features information related to a wide range of applications associated with facets of electromagnetism such as, but not limited to motors, lighting as well as controlling and switching numerous other processes, for example, supply of fuel (e. g. compressed gas, liquefied fuel pumped through electrically controlled nozzles etc;) through electrical controls in various applications that adopt similar methodologies to what is illustrated above can be obtained in order to conduct process coordination in such contexts.

In accordance with the present innovation, in obtaining information for conducting process coordination in a process environment involving a plurality of chemical processes (e. g. electrochemical cell) a plurality of characteristic identifying components (224) in the sources (150) identify the respective characteristics of a plurality of information on selected processes (e. g. the electromotive force in the cell, variations in the chemical composition in the ionized media and the variations in electrochemical potential of the ionized media) in selected operational units (300) (e.g. segments of the electrodes, segments of the ionized media).

These novel techniques, since the chemical processes are closely interlinked with other similar processes in the subject process environment (e, g. the variations in the ionized media—proportions of $H_2O$ and $SO_4$ 2-—in an electrochemical cell are closely interlinked with other associated processes including, but not limited to, the well known 'redox' reactions, that also result in corrosion and deposition at the respective electrodes and the related quantum-mechanical tunneling which enables electron release resulting in the respective concentrations of charges at the electrodes which, in turn, upon closure of the circuit facilitates supply of electromotive force to an equipment—motor, lighting equipment), in one key aspect of the present innovation, the novel instruments therein by analysing information from the respective sources (150) (e. g. information on formation of $H_2O$ and $SO_4$ 2- and temperature of the ionized media) facilitate formulating interrelations and their patterns of the selected processes, (e. g. corresponding electromotive force and electrochemical potential) adopting the variable operational step of the computing component (250) and the statistical and probabilistic analytical engines (275).

In accordance with the present innovation, formation related to a wide array of applications associated with chemical processes, ranging from biological functions in human and animal bodies as well as in other living organisms including plants and micro organisms to industrial chemical processing and production can be obtained adopting similar methodologies to what is illustrated above in order to conduct process coordination in such contexts.

In obtaining information for conducting process coordination in a process environment such as an electromagnetic radiation based information handling environment (e. g. Infrared based video camera), in one key aspect of the present innovation, a plurality of characteristic identifying components (224) in the sources (150) identify the respective characteristics of a plurality of information on selected processes (e. g. Infrared radiation and sound waves of different frequencies and amplitudes). The novel techniques, in accordance with the present innovation, thus obtain information at the respective sources (150), identified by the corresponding reference characteristic identifying components (224) and received by the respective reference characteristic receiving components (226), based on the instructions of the computing component (250) and the statistical and probabilistic analytical engines (275). In accordance with the present innovation in a process environment such as an electromagnetic radiation based information handling environment, information on relevant electromagnetic radiation beams (e. g. Infrared based beams) and sound waves among other processes are obtained.

In one key aspect of the present innovation, information related to a wide array of applications associated with electromagnetic radiation and ionizing radiation can be obtained adopting similar methodologies to what is illustrated above in order to conduct process coordination in such contexts. As the different facets of ionizing radiation includes measurable energy transfers, which can be quantified by implementing commonly found methods in scientific literature, and also due the fact that their respective velocities of within different media can be identified, in accordance with the present innovation, the novel instruments while effecting periodic interruptions to obtaining information on ionizing radiation and the parallel energy transfers (e. g. periodic interruptions to exposure of a specific mass of water to ionizing radiation and thus energy transfer) that disclose the attributes of the respective ionizing radiating beams as well as at the locations where such energy transfers occur (e. g. mass of water that receives thermal energy due to ionizing radiation) conduct the necessary analyses of the information in order to facilitate conducting process coordination in these contexts.

In accordance with the present innovation, as mentioned above, these novel instruments utilising the novel features in obtaining information on processes that occur in temporal extents lesser than the shortest variable of the variable operational step of the computing component (250) and the statistical and probabilistic analytical engines (275) outline a basis for establishing said processes as quantifiable entities in terms of a common temporal and resource framework adopting said variable operational step of the component (250). These novel techniques adopting said framework as well establish the interrelations and their patterns of identified associated processes at operational units of different scales, which in turn, facilitate disclosing differentiations in temporal states and a selection of resource utilisation and outcome during their operations in different practical applications enabling improved process coordination. The robust basis provided by the novel instruments adopted in the subject innovation enables establishing these differentiations theoretically at n extent of operational units from microscopic to macro scales as suited for process coordination in the respective applications.

By establishing collectives of temporal states of external supply of electricity at different operational units in a motor such as segments of conducting coils, segments in laminations utilising these novel instruments that adopt the variable operational step of the computing component (250) of the system (100), for example, the differentiations among said collectives of temporal states, resource utilisation and outcome with those of the associated processes such as magnetic flux, inductance and the electromagnetic forces as well as at a different temporal scale, the angular movement of rotor due to kinetic energy can be formulated.

Similarly, these novel instruments that formulate collectives of temporal states of electromotive force in an electrochemical cell adopting the variable operational step of the computing component (250) of the system (100), establish the differentiations in collectives of temporal states, resource usage and outcome across different energy forms and chemical processes such as redox reactions, variations in compositions in the ionized media and the electrochemical potential at the respective operational units such as segments of electrodes, segments of the ionized media.

The temporal and resource differentiations among the processes that can be established in terms of the above bases, in accordance with the present innovation, include a plurality of chemical operations, that involve formation and modification of a wide range of intra and inter atomic bonds involving a variety of energy forms, such as, thermal energy, electro chemical potential as well as chemical energy, as evidenced through the outline of application n an electrochemical based process environment, mentioned supra.

Establishing the collectives of temporal states of the selected operations in process environments that involve intra and inter atomic bonds, in relation to those of the associated processes as well as the values of a selection of such properties and the durations of maintaining these values, in accordance with the present innovation, facilitate deriving an array of benefits, in a wide range of contexts, including chemical processing, chemical energy, medical and pharmacological applications as well as in biological, botanical and in nanotechnological based applications, among others.

The novel techniques that establish these differentiations provide significant practical advantages in a wide range of fields and industries that utilise electrical energy, chemical reactions as well as different facets of electromagnetic radiation and ionizing radiation. Carrying out the application of the key aspects of the subject innovation in some of these areas is further explained below.

In accordance with the present innovation, the novel instruments that formulate these differentiations facilitate establishing vital basis for practical application by system (100) in a context specific manner. As the above mentioned differentiations touch upon temporal dimension, resource utilization across different forms and types as well as outcome, in one key aspect of the present innovation, such applications can be not only be dynamically tailored to suit field (e. g. usage of electrical energy, chemical processing) but specific context (e. g. high output rate electric motor or energy saving operation in chemical processing) of its application.

Effecting periodic interruptions to selected processes in a process environment for temporal extents dynamically formulated by the system (100) is one such vital application of the novel instruments. In applications such as those using electrical energy—electric motors, lighting, heating—as well as those based on facets of electromagnetic radiation—infrared, Laser—these novel instruments facilitate effecting these periodic interruptions based on the abovementioned differentiations in temporal and resource usage scales while maintaining their respective operational standards bringing numerous advantages in energy saving and optimising outcome through process coordination.

In accordance with the present innovation, utilising the temporal and resource differentiations formulated by these novel instruments effecting periodic interruptions to transmission of external electricity to selected operational units (300)—segments of conducting coils in a motor, segments of semi conducting components in a LED lighting equipment, segments of heating elements—in different applications that operate on electricity bringing practical advantages of its novel techniques.

In accordance with the present innovation, the novel instruments that establish these differentiations at selected operational units (300) in a process environment (001) that utilise electrical energy offer advantages in situations of earth leakages as well. As the information on electricity (e. g. voltage, current, resistance) is obtained from different sources (150) in a process environment at the variable operational step of the computing component (250) and the statistical and probabilistic analytical engines (275), and also the interruptions to supply of electricity are effected facilitating obtaining information on resistance in the circuit, an earth leakage can be not only detected, but an instruction to interrupt the transmission of electricity only to the affected operational unit or location avoiding disruption of other operations can be generated, if and when the relevant properties of electricity in the circuit (e. g. resistance) deviate from predetermined parameters. With the application of these novel instruments in electrical energy based contexts, the risk of electrocution due to earth leakage is practically eliminated, as the duration required for detection and effecting interruptions to supply of power, in one key aspect of the present innovation, are much shorter than the temporal extents of electrocution to become a safety and/or health hazard, while the context specific interventions (e. g. shutting down power supply) avoid disruption to operation of other operational units that are not affected by the earth leakage.

In conducting process coordination, the instructions of the computing component (250) derived upon the inferences of the statistical and probabilistic analytical engines (275) are transferred to the activating controlling components (280) in the system (100). The activating components transfer these signals such as effecting and initiating supply of external electricity to the respective controlling components (290) at the respective operational units (300). The plurality of characteristics of the information on these processes and their respective associated processes is transferred to the respective reference characteristic identifying (224) and receiving (226) and modificating (227) components in the sources (150) while the component (280) conducts error handling of these transfers as well. Since these novel instruments facilitate employing scalable operational units (300) in electrical energy based applications such as electric motors and lighting, for instance, while the temporal extents of supplying electricity and its selected associated processes as well as the activation and interruptions are controlled by the system (100) the corresponding compositions and the dynamically formulated combinations of said operational units are also governed by the system (100). For example, the compositions and their dynamically formulated combinations of a type of operational units (300)—segments of conducting coils, segments in laminated core—can assume different physical characteristics and scales that have the capacity to create associated processes such as magnetic flux, inductance and electricity in rotor and other similar section in order to create the necessary electromagnetic force in an optimum manner, such as but not limited to said segments of conducting coils being parallel to the direction of angular movement of rotor with their respective ends at very close intervals, facilitating more precise initiation and interruption to supply of electricity and more precise creation of electromagnetic forces and resulting smoother kinetic energy (e. g. torque), thus optimising resources and outcome.

Since the novel mechanisms in the present innovation facilitate disclosing differentiations in temporal states and a selection of resource utilisation and outcome during the operations in a process environment in a robust manner across different energy forms, temporal extents and behavioural patterns of actors and agents at microscopic through macroscopic scales, as well as across different interconnected process environments mentioned supra, they enable forming a versatile basis for exchange of resources (e. g. electricity) at intra as well as inter process environment scales. The basis for exchange (e. g. exchange of electricity), in accordance with the present innovation, in turn, facilitates formulating temporal extents of selected processes (e, g. T2-temporal extent of interruption to electricity supply to an electric equipment commencing at the time punctuation hh:mm:ss:mss, upon Y-Coulomb electricity input comprising P-volts and Q-Amperes at R-kHz in Pulse Width Mode provided for a duration of T1, ss:mss) as a vital resource, that would form the basis for providing a commercially available range of products and services in a time and location specific manner, for example, embedded in electricity supply networks, across different scales (e. g. among a few equipment in a home, in a large region with large machinery and industrial facilities where power generation plants that can dynamically respond to demand for 'temporal extents in power supply' are part of network).

In one key aspect of the present innovation, the novel instruments formulating differentiations in temporal states, resource usage and outcome that establishes framework for effecting periodic interruptions, thus optimising the processes can also be applied in process environments such as Infrared based devices.

In accordance with the present innovation, information is obtained through a plurality of sources (150), each comprising a plurality of processing components (221) and a buffering component (230). Each processing component comprises a reference information identifying component (224), coupled to a reference characteristic receiving component (226), a reference characteristic modificating component 7) and a communicating component (216) and punctuation incorporating component (217) to facilitate transfer of data of the information obtained to the process coordinating component (101), which includes the computing component (250) and the statistical and probabilistic analytical engines (275).

Upon information (e. g. a sound wave, a light beam) reaching the respective reference information identifying components (224), a signal from the signaling component (225) is received at the process coordinating component (101) for energising the components to formulate Infrared based data. While energising is carried out the computing component (250) and the statistical and probabilistic analytical engines (275), based on the variable operational step analyse the associated processes including the activation of the reference information receiving components (226) and the corresponding operational unit (300)—Infrared based data formulating component—upon supply of energy (e.g. voltage, current and frequency of energy supply in an electricity based Infrared signal creator, the corresponding wavelengths and amplitude of Infrared signal) in order to establish the interrelations and their patterns. These analyses and the interrelations and their patterns include those of the return signals from the Infrared based error handling component from the receiving section in the Infrared based device for error handling and establishing the completion of the transfer of data.

Based on these interrelations and their patterns among the interrelated processes including energising and creation of Infrared based data, in terms of the variable operational step of the component (250), these novel instruments adopting the computing component and the statistical and probabilistic analytical engines effect interruptions to the creation of the infrared based signal incorporating the electromagnetic radiation based data transmission as a quantifiable process with quantified temporal extents, resources and outcome.

In incorporating this data transmission, the process coordinating component (250) based on said variable operational step effect a plurality of interruptions to the Infrared based transmission for dynamically determined temporal extents and monitor 'No-Infrared' signals accompanied by Infrared punctuations for analysis, formulating the interrelations and the patterns of interrelations with associated operations, mentioned supra. In situations where the process coordinating components at emitting and receiving locations are not directly interconnected, the interrelations and their patterns of the return signals mentioned supra, in conjunction with those related to the operation including energising and, transmission of signals are utilised to formulate these interrelations and their patterns in relation to the temporal extents of the interruptions to the transmission of the infrared based signal between the emitting and receiving devices. As a person skilled in the art will note, these interruptions to the transmission may be conducted adopting methods such as by effecting periodic interruptions to the supply of energy to the source of Infrared signal, by effecting variations in the 'eye', i.e. source of emitting and by conducting variations among the Infrared emitting components, in order to diversify the bases of operation, while formulating Infrared based data primarily on the temporal extents of the interruptions.

In one key aspect of the present innovation, making use of the incorporation of transmission of electromagnetic radiation as a quantifiable process these novel techniques adopting the interruptions formulated in terms of the variable operational step of the computing component (250) and the statistical and probabilistic analytical engines (275) establish a framework for information handling. Adopting the common temporal basis established in terms of the variable operational step of the computing component and the statistical and probabilistic analytical engines, the collectives of temporal states of interruptions effected to the transmission of Infrared based signals, in one key aspect of the present innovation, enabling formulating data states for information handling.

Based on the instructions of the computing component (250), as the respective reference characteristic receiving components (226), the communicating components (216) and the punctuation incorporating component (217) create signals to be shared to cater to multiple requests (e. g. an audio signal to be mixed with another audio signal while being combined with a video signal simultaneously). These signals are transferred to the respective operational units (300)—Infrared based data formulating components—for transferring the data incorporating the attributes including 'no Infrared radiation' attributes, as well as the temporal attributes, based on temporal states adopting the variable operational step of the computing component (250).

An Infrared emitting component at the Infrared based data formulating component interlinks starting and ending Infrared based punctuations to each of the data states, based on the instructions of the computing component (250), adopting the inferences by the statistical and probabilistic analytical engines (275), completing the Infrared data state formation. The novel techniques adopted to create data states with dynamically variable Infrared radiation attributes, including 'no radiation' and temporal attributes, in accordance with the present innovation, facilitate optimum resource usage and effective information handling in an infrared based process environment.

In one key aspect of the present innovation, utilising the computing component (250) and the statistical and probabilistic analytical engines (275), a plurality of information processing components (221) at each of a plurality of sources (150) and a plurality of operational units (300)—Infrared based data formulating components—are configured for data transfer simultaneously, adopting the 'no radiation' temporal states. Adopting the 'no radiation' states, the novel instruments in the present innovation facilitate flexible utilisation of Infrared based data transferring components, enabling simultaneous transfer of data. In accordance with the present innovation, the computing component and the statistical and probabilistic analytical engines provide dynamic identities to the each of these components as well as the configured groups of components and assign different tasks of formulating data for information received from multiple sources.

Based on the disclosure of the application of the novel features of the present innovation in an Infrared based process environment, the applicability and adoption of these instruments in a multitude of process environments that utilise different types of media, including facets of electromagnetic radiation that transmit energy as well as information in microscopic through macroscopic scales becomes evident.

Similar to the Infrared based process environment explained herein, in an audio visual process environment, for example, where electromagnetic radiation, i. e. light, as well as sound wave based information is present, in accordance with the present innovation, a process coordinating system can be utilised. As was adopted in the Infrared based information system, mentioned supra, the respective emitting components for electromagnetic radiation and sound waves (e. g. for light and sound), based on the instructions of the computing component and the statistical and probabilistic analytical engines, that conduct analyses of the selected processes for formulation of the respective collectives of temporal states can be utilised to create signals adopting the 'no transmission' (e. g. light and sound) data states, which can be identified at one or more respective reference characteristic identifying components and reference characteristic receiving components that operate based on the instructions of a process coordinating component, a person skilled in the art would be able to apply in a variety of contexts, adopting these aspects of the present innovation.

In situations where the information handling protocols with the creating 'actor' of information moving animal creating audio visual and Infrared signals) are not established, in accordance with the present innovation, similar to the application in an Infrared based environment, described supra, adopting the respective pluralities of reference characteristic identifying components, reference characteristic receiving components and reference characteristic modificating components for different facets of information (e. g. different bands of frequencies and amplitudes of the electromagnetic spectrum and of sound waves), the information can be obtained for information handling. Based on the analyses and establishing of interrelations among these characteristics of different types of information (e. g. electromagnetic spectrum, sound waves) in terms of the variable operational step, the computing component and the statistical and probabilistic analytical engines, in accordance with the present innovation, instructs the respective reference characteristic identifying components, reference characteristic receiving components and reference characteristic modificating components to interrupt formulating and transferring such information as data states, for the temporal extents their attributes remain within the parameters as revealed through the previous analysis, thus optimising the operations, while ensuring that they are analysed and their patterns established for highly accurate and high performance data handling.

In accordance with the present innovation, utilizing the novel features in obtaining information and formulating differentiations of operation of processes in a process environment including those occurring in temporal extents lesser than the shortest variable of the variable operational step of the computing component (250) that facilitate effecting periodic interruptions to processes such as facets electromagnetism and electromagnetic radiation enables a vital application in incorporating gravitational forces into relevant process environments as a quantifiable and interrelated entity. Utilising these novel instruments, firstly the temporal extent of the transmission of a beam of electromagnetic radiation (T 1) such as visible light for the predetermined distance between the component (224) and the component (226) under predetermined atmospheric conditions (e. g. in a vacuum at 0 0 C. temperature) where it is possible to avoid refractive effects and different velocities associated with light travelling in a medium, is obtained by transferring a series of such beams durations are quantified in relation to the number of steps of the shortest variable of the operational step of the computing component (250). Secondly, series of punctuations of same radiation pulses in durations as small as the shortest variable of the operational steps are transmitted in a sequence where receiving of that pulse at the component (226) is synchronized with the emitting of the subsequent pulse from the component (224) thus effecting optimum temporal extents (T 2) of interruptions to each of the transmissions. In accordance with the present innovation, while incorporating the respective temporal extents of associated processes such as energising of the components, transfer of signals on emitting, receiving and verifications with the computing component (250) and the statistical and probabilistic analytical engines (275) as well as due to factors such as variations in velocities due to properties of radiation (e. g. frequency of light), formulating the interrelations and their patterns among T 1 and T 2 in relation to the temporal extent T 3 for the above mentioned transmission for the distance between the components (224) and (226) as per the standard speed of light denoted c in the field of physics are conducted. In one key aspect of the innovation, the novel instruments that formulate these interrelations and their patterns facilitate identifying that in relation to T 3, T 1 is the temporal extent of the transmission that has the effect of gravitational forces as it is associated with the continuous transmission while T 2 accounts for the transmission that is with minimum or no effect of such gravitational forces due to the optimum interruptions in the transmissions, thus enabling establishing a simplified and practical basis for incorporating gravitational forces into process environments at different contexts (e. g. mean sea level, at different altitudes away from earth) making contributions to improve useful and common technologies such as global positioning systems (GPS) and synchronising satellite based communication.

In accordance with the present innovation, wave propagation in other forms, including ionizing radiation can also be incorporated as quantifiable processes, with quantifiable temporal extents and, quantifiable resource utilisations and outcome, as mentioned supra. Based on the specific application of ionizing radiation (e, g. X ray imaging, Gamma ray imaging, nuclear fusion and fission based thermal energy generation), establishing these interrelations and their patterns, in terms of the variable operational step of the computing component (250) and the statistical and probabilistic analytical engines (275) of the process coordination system (100), making inferences on temporal extents and quantities of introducing necessary moderating agents (e, g. water and graphite in nuclear fission based thermal energy generation) as well as on interrupting the radiation for collectives of temporal states (e.g. for information processing, similar to the system that adopt periodic interruptions to Infrared based radiation described above), can be conducted, in accordance with the present innovation, facilitating process coordination.

What is described above includes only a few examples of the application of the subject matter of the present innovation. It is evidently not practicable to enumerate every possible combination of compositions or, methodologies for the purpose of providing a description of the present innovation, but a person skilled in the art would recognise that many further combinations and permutations of the innovation are possible. The present innovation is intended to embrace all such alterations, modifications and variations that come within the spirit and scope of the appended claims, accordingly. Furthermore, to the extent that the term 'includes' is used, either in the detailed descriptions or in the claims, such term is intended to be inclusive in a manner similar to the term 'comprising' as 'comprising' is interpreted, when employed as a transitional word in a claim.

What is claimed is:

1. A system that facilitates process management in a process environment, the process environment comprising:
   one or more physical operational units, wherein each physical operational unit generates information about one or more facets of transmission of electromagnetism, facets of transmission of electromagnetic radiation, or electrochemical potential within and among the physical operational units;
   a physical process coordinating component comprising a physical computing component that contains one or more statistical and probabilistic analytical engines and a buffering component, the physical computing component operating at a plurality of operational steps of varying durations;
   one or more physical sources that are connected to the physical process coordinating component, wherein each physical source is also connected to one of the one or more physical operational units, wherein each physical source contains one or more processing components that each contain a reference characteristic identifying component, a reference characteristic receiving component, a reference characteristic modificating component, and a communicating component;
   wherein each reference characteristic identifying component, upon obtaining the information from the connected physical operational unit, sends a signal to the physical computing component, then identifies a reference characteristic of the information, and then initiates a transfer of the reference characteristic to the reference characteristic receiving component;
   wherein the physical computing component, upon receiving the signal from the reference characteristic identifying component, is configured to:
      effect periodic interruptions of variable durations to external energy powering the reference characteristic identifying component while the reference characteristic identifying component performs the transfer of the reference characteristic to the reference characteristic receiving component, the durations of the interruptions being expressed as a multiple of a shortest operational step of the plurality of operational steps;

cause the one or more statistical and probabilistic analytical engines to analyze the reference characteristic to determine whether the reference characteristic falls within a predetermined pattern, wherein:
when the reference characteristic falls within the predetermined pattern, the duration of the periodic interruption is maintained; and
when the reference characteristic falls outside the predetermined pattern, the duration of the periodic interruption is dynamically varied;

establish a relationship between the reference characteristic and another reference characteristic based on the duration of the periodic interruption, that is identified by another reference characteristic identifying component of the source;

wherein upon the reference characteristic receiving component receiving the reference characteristic from the reference characteristic identifying component, the physical computing component instructing the reference characteristic modification component to generate a modified reference characteristic by varying the received reference characteristic based upon the established relationship; and wherein the reference characteristic receiving component is further configured to transfer the modified reference characteristic to the communication component, which transfers the modified reference characteristic to the buffering component.

2. The system of claim 1, wherein the physical computing component is connected to a plurality of physical activating components.

3. The system of claim 2, wherein each physical activating component is connected to a plurality of physical elemental units, a plurality of physical conductive units, and a plurality of physical insulated conductive units.

4. The system of claim 1, wherein the effected periodic interruptions conform to a plurality of operational safety systems.

5. The system of claim 1, wherein the effected periodic interruptions conform to a plurality of information security systems.

6. A computer-implemented method for facilitating process coordination in a process environment, the process environment comprising:
one or more physical operational units, wherein each physical operational unit generates information about one or more facets of transmission of electromagnetism, facets of transmission of electromagnetic radiation, or electrochemical potential within and among the physical operational units;
a physical process coordinating component comprising a physical computing component that contains one or more statistical and probabilistic analytical engines and a buffering component, the physical computing component operating at a plurality of operational steps of varying durations;
one or more physical sources that are connected to the physical process coordinating component, wherein each physical source is also connected to one of the one or more physical operational units, wherein each physical source contains one or more processing components that each contain a reference characteristic identifying component, a reference characteristic receiving component, a reference characteristic modificating component, and a communicating component;

wherein each reference characteristic identifying component, upon obtaining the information from the connected physical operational unit, sends a signal to the physical computing component, then identifies a reference characteristic of the information, and then initiates a transfer of the reference characteristic to the reference characteristic receiving component;

wherein the physical computing component, upon receiving the signal from the reference characteristic identifying component, is configured to:
effect periodic interruptions of variable durations to external energy powering the reference characteristic identifying component while the reference characteristic identifying component performs the transfer of the reference characteristic to the reference characteristic receiving component, the durations of the interruptions being expressed as a multiple of a shortest operational step of the plurality of operational steps;

cause the one or more statistical and probabilistic analytical engines to analyze the reference characteristic to determine whether the reference characteristic falls within a predetermined pattern, wherein:
when the reference characteristic falls within the predetermined pattern, the duration of the periodic interruption is maintained; and
when the reference characteristic falls outside the predetermined pattern, the duration of the periodic interruption is dynamically varied;

establish a relationship between the reference characteristic and another reference characteristic based on the duration of the periodic interruption, that is identified by another reference characteristic identifying component of the source;

wherein upon the reference characteristic receiving component receiving the reference characteristic from the reference characteristic identifying component, the physical computing component instructing the reference characteristic modification component to generate a modified reference characteristic by varying the received reference characteristic based upon the established relationship; and wherein the reference characteristic receiving component is further configured to transfer the modified reference characteristic to the communication component, which transfers the modified reference characteristic to the buffering component.

7. The method of claim 6, further comprising connecting the physical computing component to a plurality of physical activating components.

8. The method of claim 7, further comprising connecting each physical activating component to a plurality of physical elemental units, a plurality of physical conductive units, and a plurality of physical insulated conductive units.

9. The method of claim 6, wherein the physical computing component is connected to a plurality of physical activating components.

10. The method of claim 7, wherein each physical activating component of the plurality of physical activating components is connected to a plurality of physical elemental units, a plurality of physical conductive units, and a plurality of physical insulated conductive units.

11. A computer program product stored in a non-transitory computer readable medium which, when executed by a processor, performs a method for facilitating process coordination in a process environment, the process environment comprising:
- one or more physical operational units, wherein each physical operational unit generates information about one or more facets of transmission of electromagnetism, facets of transmission of electromagnetic radiation, or electrochemical potential within and among the physical operational units;
- a physical process coordinating component comprising a physical computing component that contains one or more statistical and probabilistic analytical engines and a buffering component, the physical computing component operating at a plurality of operational steps of varying durations;
- one or more physical sources that are connected to the physical process coordinating component, wherein each physical source is also connected to one of the one or more physical operational units, wherein each physical source contains one or more processing components that each contain a reference characteristic identifying component, a reference characteristic receiving component, a reference characteristic modificating component, and a communicating component;
- wherein each reference characteristic identifying component, upon obtaining the information from the connected physical operational unit, sends a signal to the physical computing component, then identifies a reference characteristic of the information, and then initiates a transfer of the reference characteristic to the reference characteristic receiving component;
- wherein the physical computing component, upon receiving the signal from the reference characteristic identifying component, is configured to:
  - effect periodic interruptions of variable durations to external energy powering the reference characteristic identifying component while the reference characteristic identifying component performs the transfer of the reference characteristic to the reference characteristic receiving component, the durations of the interruptions being expressed as a multiple of a shortest operational step of the plurality of operational steps;
  - cause the one or more statistical and probabilistic analytical engines to analyze the reference characteristic to determine whether the reference characteristic falls within a predetermined pattern, wherein:
    - when the reference characteristic falls within the predetermined pattern, the duration of the periodic interruption is maintained; and
    - when the reference characteristic falls outside the predetermined pattern, the duration of the periodic interruption is dynamically varied;
  - establish a relationship between the reference characteristic and another reference characteristic based on the duration of the periodic interruption, that is identified by another reference characteristic identifying component of the source;
- wherein upon the reference characteristic receiving component receiving the reference characteristic from the reference characteristic identifying component, the physical computing component instructing the reference characteristic modification component to generate a modified reference characteristic by varying the received reference characteristic based upon the established relationship; and
- wherein the reference characteristic receiving component is further configured to transfer the modified reference characteristic to the communication component, which transfers the modified reference characteristic to the buffering component.

12. The computer program product of claim 11, wherein the physical computing component is connected to a plurality of physical activating components.

13. The computer program product of claim 12, wherein each physical activating component of the plurality of physical activating components is connected to a plurality of physical elemental units, a plurality of physical conductive units, and a plurality of physical insulated conductive units.

14. The computer program product of claim 12, wherein the effected periodic interruptions conform to a plurality of operational safety systems.

15. The computer program product of claim 11, wherein the effected periodic interruptions conform to a plurality of information security systems.

* * * * *

UNITED STATES PATENT AND TRADEMARK OFFICE
CERTIFICATE OF CORRECTION

PATENT NO. : 9,875,136 B2  
APPLICATION NO. : 14/400219  
DATED : January 23, 2018  
INVENTOR(S) : Indrajith Kuruppu and Don Damith Nadishan Colambathanthrige Page 1 of 1

It is certified that error appears in the above-identified patent and that said Letters Patent is hereby corrected as shown below:

On the Title Page

Item (71) Applicants should read:
--(71) Applicant: Indrajith Kuruppu, Colombo (LK)--.

Signed and Sealed this  
Nineteenth Day of March, 2019

Andrei Iancu  
*Director of the United States Patent and Trademark Office*